Jan. 5, 1965 J. A. RAJCHMAN 3,164,813

MAGNETIC DEVICE

Filed Sept. 30, 1950 5 Sheets-Sheet 1

INVENTOR

JAN A. RAJCHMAN

BY Morris L. Rabkin

ATTORNEY

INVENTOR
JAN A. RAJCHMAN
BY Morris Rabin
ATTORNEY

INVENTOR
JAN A. RAJCHMAN
BY Morris L. Rabkin
ATTORNEY

Jan. 5, 1965 J. A. RAJCHMAN 3,164,813

MAGNETIC DEVICE

Filed Sept. 30, 1950 5 Sheets-Sheet 4

INVENTOR
JAN A. RAJCHMAN
BY Morris A. Rabkin
ATTORNEY

INVENTOR
JAN A. RAJCHMAN
BY Morris Rabkin
ATTORNEY

United States Patent Office 3,164,813

Patented Jan. 5, 1965

3,164,813

MAGNETIC DEVICE

Jan A. Rajchman, Princeton, N.J., assignor to Radio Corporation of America, a corporation of Delaware Filed Sept. 30, 1950, Ser. No. 187,733

32 Claims. (Cl. 340—174)

Figure 1:
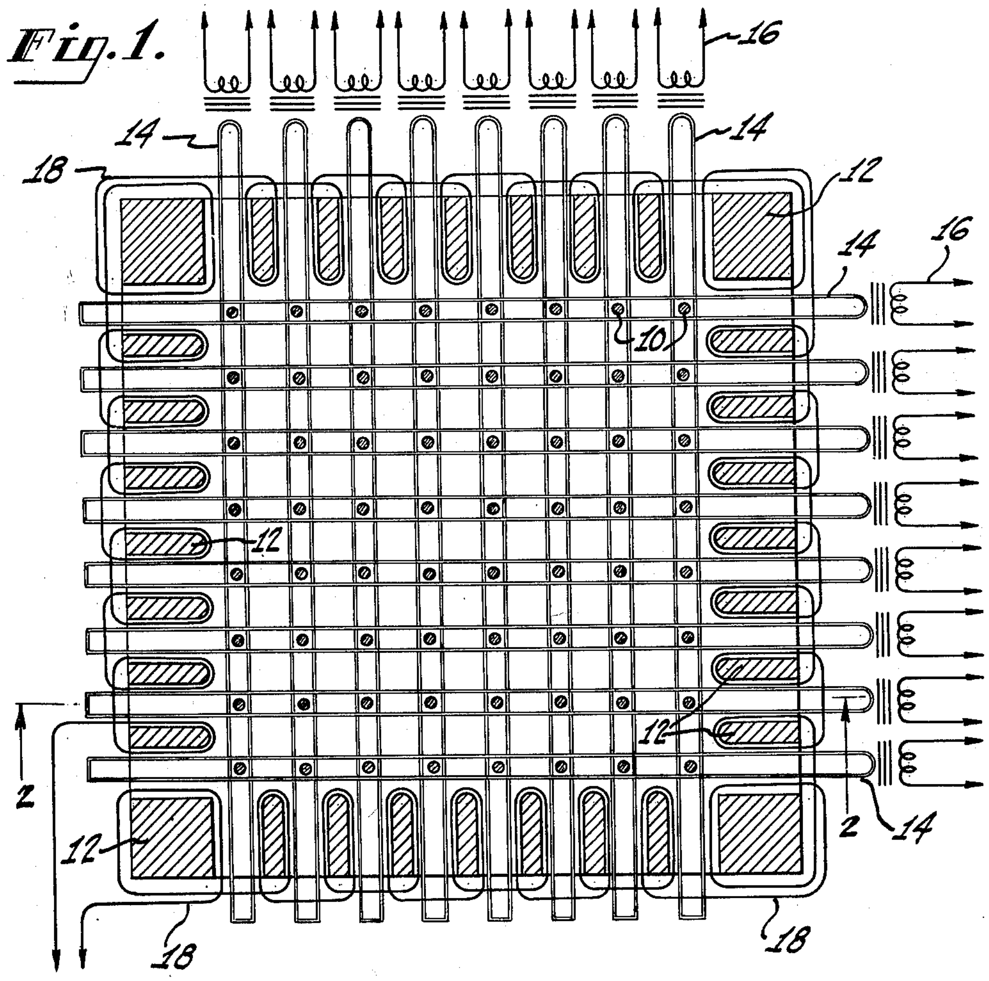

This invention relates to magnetic devices such as are used in information handling machines including computers, and calculating machinery, and more particularly relates to devices such as a magnetic matrix memory permitting random access thereto.

An essential part of computing or calculating machinery is the storage device or memory wherein information such as results, partial results, or routines may be stored. Memories are also used in information handling devices just for storing information to which access may be had conveniently. Presently known memories such as magnetic tape, mercury, delay lines and the like, either have moving parts, usually require serial access, and do not permit rapid random access to the information stored, or require the use of power to hold the information stored or are bulky and expensive.

It is an object of this invention to provide an improved magnetic device permitting rapid access to stored information.

It is another object of the present invention to provide an improved magnetic memory permitting rapid random access, including serial access, to stored information.

It is still another object of the present invention to provide an improved magnetic memory which is smaller in size than any known heretofore.

Yet another object of the present invention is the provision of an improved random access magnetic memory which has no moving parts.

These and other objects of my present invention are achieved by using a plurality of easily saturable magnetic cores arranged in a matrix fashion or in regular pattern of rows and columns of cores. A common low reluctance and non-saturable magnetic return path is provided for all the cores or for groups of the cores. A plurality of coils or loops are used which are interlaced amongst the cores in such fashion that by exciting two or more of these coils only one of the cores receives a magnetomotive force which is sufficient to cause it to go to a desired condition of saturation. The remaining cores are unaffected. In order to increase the selectivity of the matrix the remaining coils may be excited with a current of opposite polarity and lesser amplitude than the selected coils. A reading circuit is provided by a coil wound around the magnetic return path. The coils, which enclose a core whose condition it is desired to interrogate, are excited with a current having a predetermined polarity. If the core is in the saturated condition to which it would be forced by the magnetomotive forces generated by the coils, no output is noted in the reading circuit coil. If the core is in a saturated magnetic condition of opposite polarity, then the generated magnetomotive forces drive it to a saturated magnetic condition of opposite polarity. The changing flux linkages through the magnetic return path induce a voltage in the coil wound around the return path and thus an indication of the condition of a core is obtained by the presence or absence of a voltage in the detector coil in response to the interrogating voltages.

Figure 2:
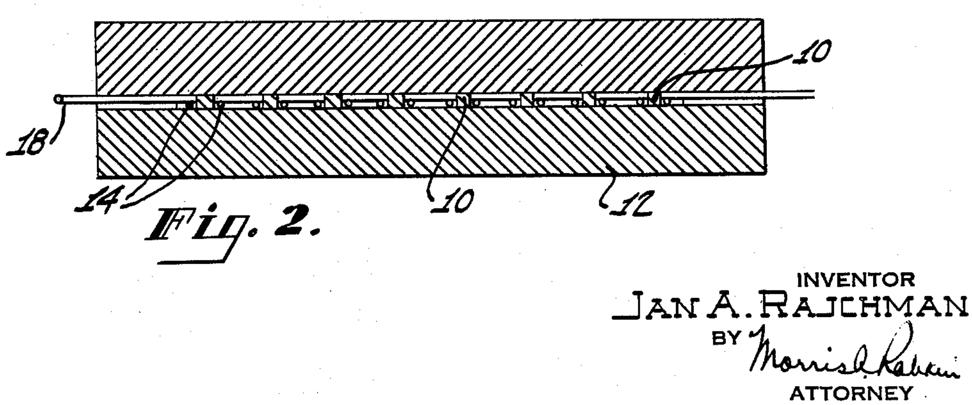
Figures 3, 4, 5, 6, 6A, 7:
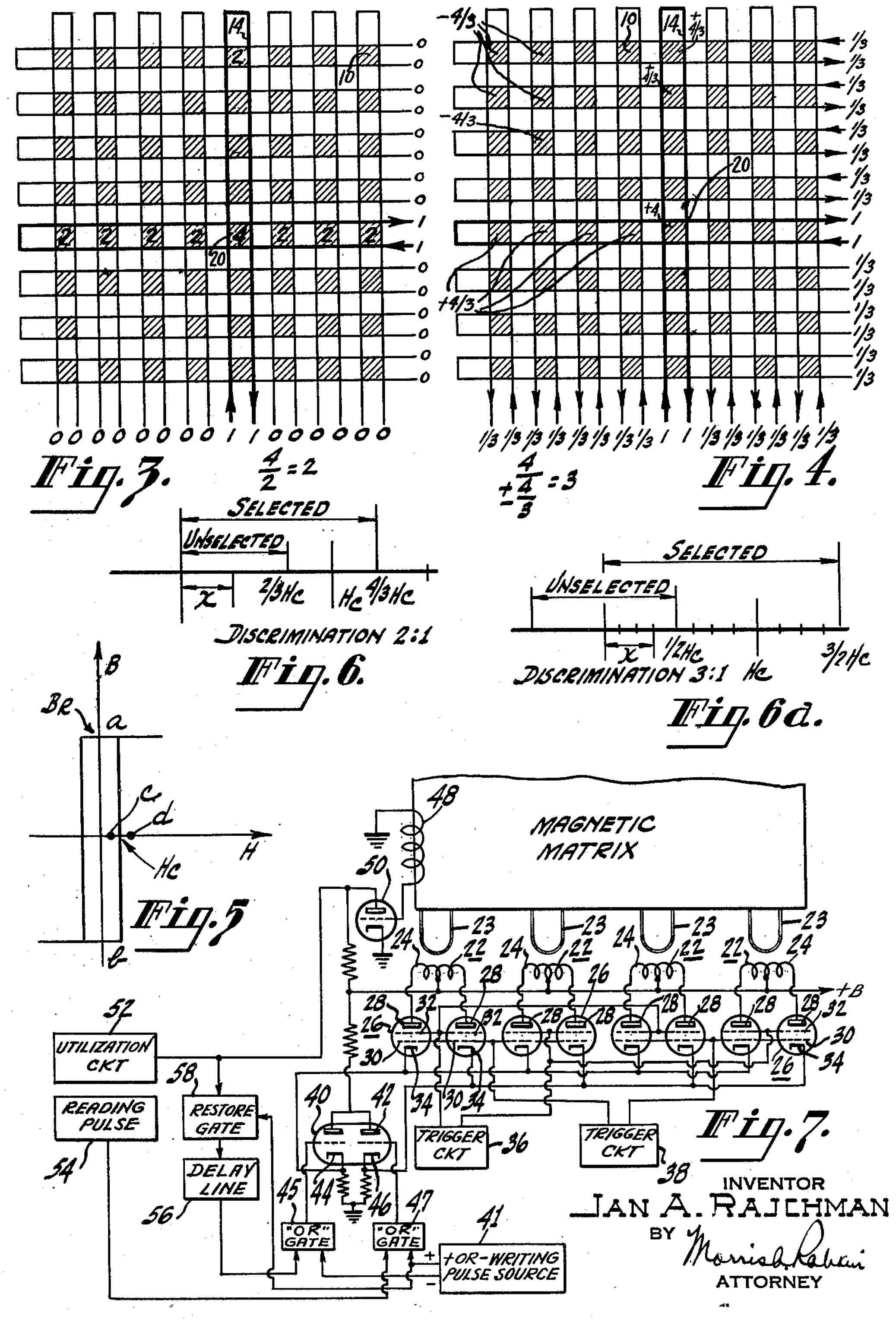
Figure 8:
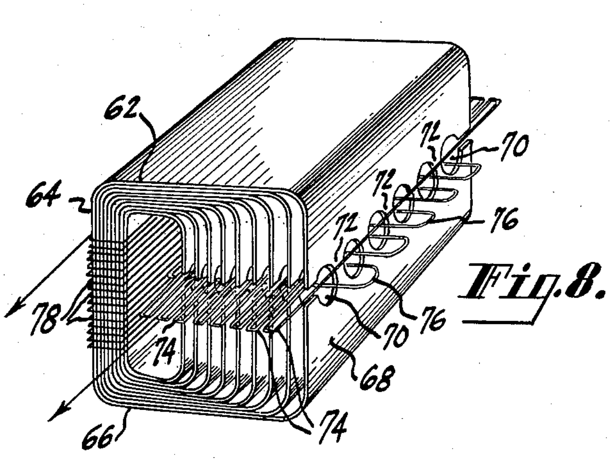
Figure 9:
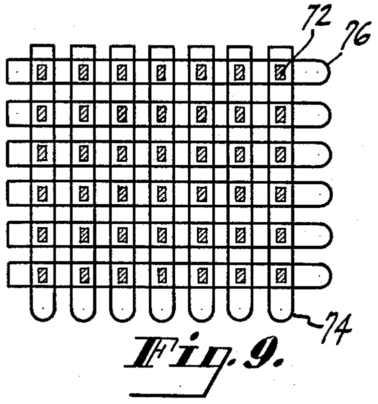
Figure 12:
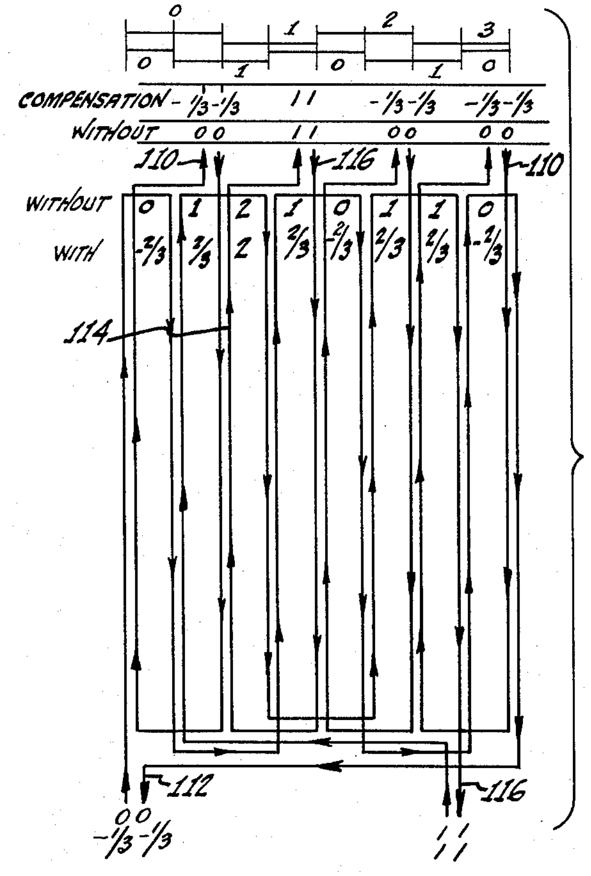
Figure 10:
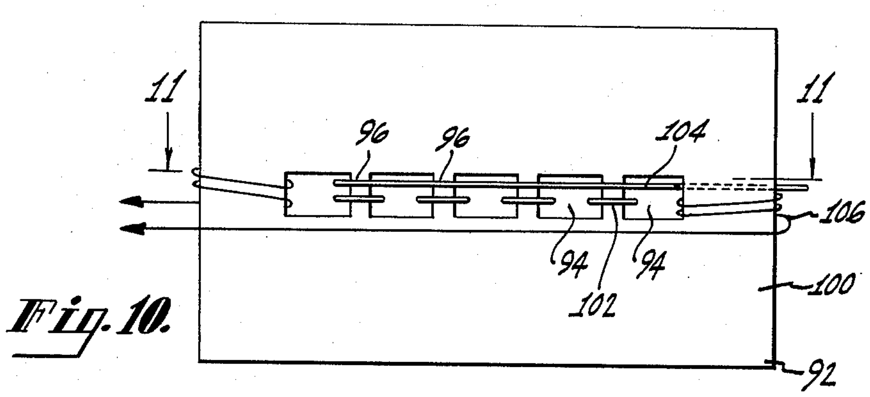
Figure 11:
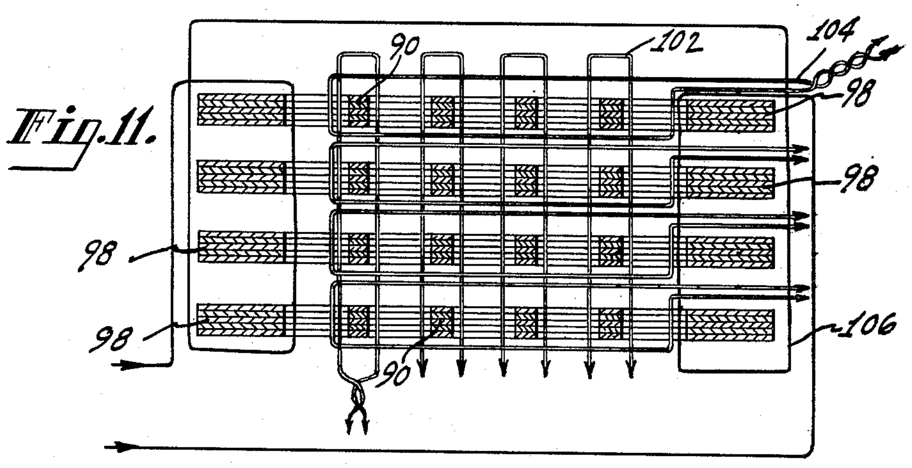
Figures 13, 14:
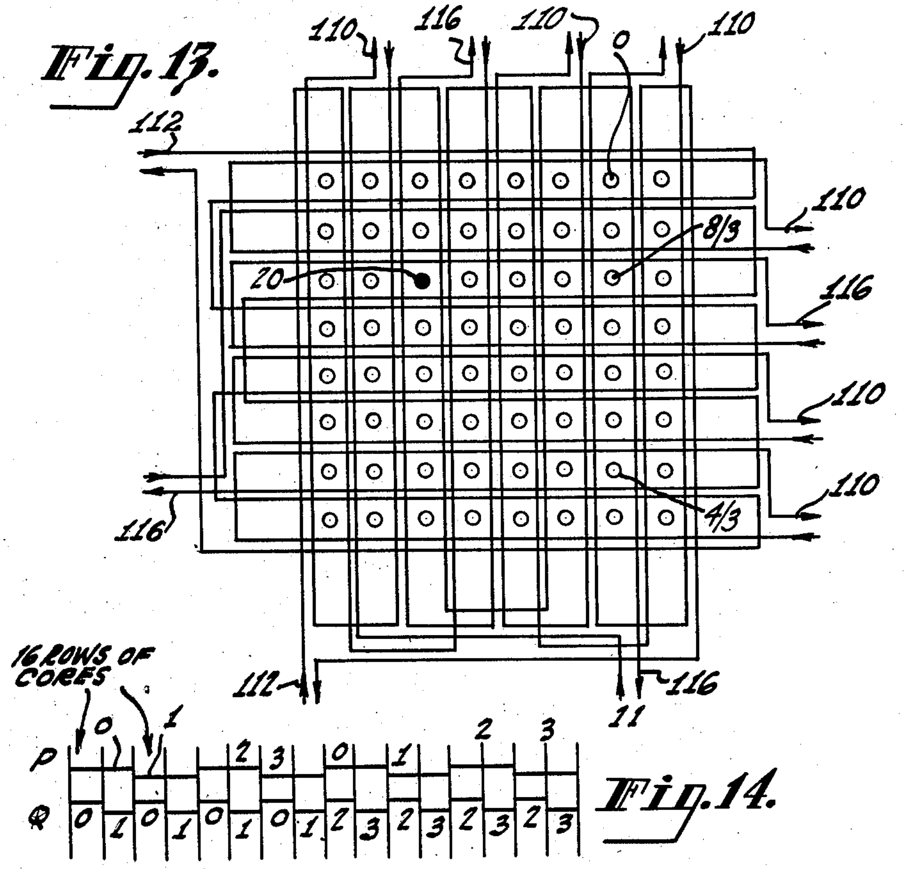
Figure 15:
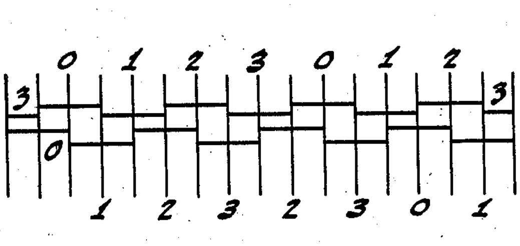
Figure 16:
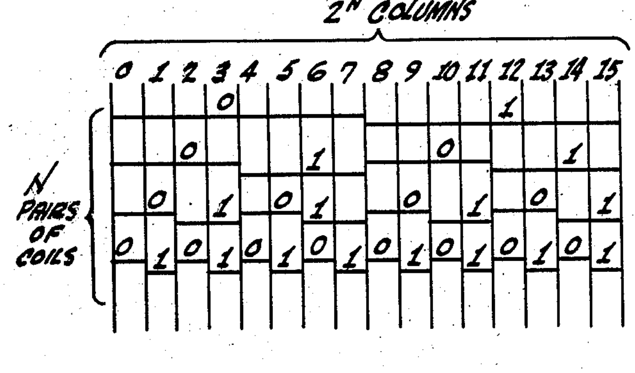

The novel features of the invention as well as the invention itself, both as to its organization and method of operation will best be understood from the following description when read in connection with the accompanying drawings, in which:

FIGURE 1 shows an end view of an embodiment of the invention,

FIGURE 2 shows a cross section and plan view of the embodiment of the invention shown in FIGURE 1, FIGURE 3 is a schematic view of an embodiment of the invention showing a system of core selection, FIGURE 4 is a schematic view of an embodiment of the invention showing a system for increasing discrimination in core selection, FIGURE 5 shows an ideal hysteresis loop, FIGURES 6 and 6*a* are graphs of the comparison of discrimination obtained upon selection, FIGURE 7 is a circuit diagram of an electric matrix core selection and reading system, FIGURE 8 is a perspective view of another embodiment of the invention, FIGURE 9 is a cross section of FIGURE 8, FIGURE 10 is a plan view of another embodiment of the invention, FIGURE 11 is a cross-sectional view of the embodiment of the invention shown in FIGURE 10, FIGURE 12 shows a schematic diagram of a combinatorial interlaced loop system for a magnetic matrix, FIGURE 13 is a circuit diagram of a complete combinatorial interlaced loop system applied to a magnetic matrix, FIGURES 14, 15 and 16 are schematic representations of other combinatorial interlaced loop systems for use in core selection of a magnetic matrix.

Considering FIGURES 1 and 2 together, the essential parts of a random access matrix magnetic memory are shown which are able to store sixty-four separate items in a "zero" or "one," or "yes" or "no" form. This consists of sixty-four small cores 10 of easily saturable magnetic material. A magnetic return path 12 is provided for the cores 10 consisting of large blocks of magnetic material which do not saturate. As shown, the cores 10 are arranged in a regular geometric pattern which may be a matrix array of rows and columns. It will be understood that a row consists of one alignment of cores, shown in the drawing as horizontal, and a column consists of another alignment of cores at an angle thereto but including one of the cores of the column in the row. The angle made by the columns and rows shown in the drawings is 90 degrees. These rows and columns are sandwiched between and enclosed by the blocks of the magnetic return path material 12.

Interlaced between the cores are a plurality of coils 14 consisting of single turn closed loops having substantially straight sides. Each single turn coil 14 encloses a single row or a single column of cores. The ends of the single turn coils extend away from the cores for some distance and are brought out from the magnetic matrix through openings in the magnetic return path. The sides of a coil are positioned as close as possible to the cores 10 which it encloses. The coil 14 may be the secondary winding of a step-down transformer 16, as shown. A multiturn winding 18 is wrapped around the sides of the magnetic return path. The winding 18 as shown in FIGURE 1, is a series of coils around each portion of the section of the magnetic return path block joining the top and bottom. These coils are all connected in series aiding fashion.

The step-down transformers 16 may be excited selectively in any well-known fashion so that a heavy current is made to flow in the single turn secondary coil 14. It will be readily appreciated that if a heavy current is made to flow in one of the coils around a row of cores, all the cores in that row are subject to a magnetomotive force generated by that coil. If a heavy current is made to flow in one of the coils around a column of cores, then the cores in that column are subject to the magnetomotive force generated by that coil.

Referring to FIGURE 3, a schematic of the core matrix and selecting loops is shown. For simplicity the magnetic return path is omitted. The heavier line selecting loops are the excited ones or the only ones with current in them. If the current in each side of a loop 14 is assumed to apply one unit of magnetomotive force, then each core 10 within an excited loop has two units applied to it and if the exciting currents are made to flow with the proper polarity, then the core 20 within the intersection of the two loops has four units of magnetomotive force applied to it. It can therefore be seen that by selecting the proper two loops for excitation, a single core 20 is selected which receives a magnetomotive force which is greater than that applied to the other cores within the excited loops. A discrimination of 2 is obtained, since the selected core or core within the excited coils' intersection, has four units of magnetomotive force applied to it as against two units applied to the remaining cores within the excited coils. The coil ends may be twisted, or spaced from the end cores, or insulated from the end cores in any fashion well known in the art.

FIGURE 4 shows a system for obtaining a discrimination of three. The desired coils having the selected core 20 within their intersection are excited as heretofore so that the selected core has an excitation of four. The remaining row coils and the remaining column coils are excited in opposite polarity to that of the repective selected or desired row and column coils. The amplitude this non-selected coil excitation is made one-third of the excitation applied to the selected coils. As may be seen in FIGURE 4 the cores within the selected coils, other than the one within the intersection, have an excitation of +4/3 magnetomotive force units. The cores within the non-selected coils have an excitation of −4/3 magnetomotive force units. Therefore, the discrimination of this system is $$\frac{4}{\frac{+4}{-3}}$$

or 3 times.

FIGURE 5 shows an ideal rectangular hysteresis loop. These are substantially approached by magnetic materials such as "Deltamax" or "Permeron." If it is assumed that the cores have a hysteresis curve such as is shown in FIGURE 5 and if it is further assumed that the cores 10 are all saturated and are at either point "*a*" or point "*b*" on the hysteresis curve, then the permeability of the saturated cores for any small additional flux is zero. Therefore the lines of flux of the cores will tend to complete their magnetic circuit through the non-saturated magnetic return path 12 and not through any of the other cores. Therefore, a magnetomotive force applied to each core can actually be computed on the basis of the number of current carrying wires surrounding it, as was done above.

Considering FIGURE 6 it may be seen that with an excitation "X" applied only to the two selected coils (such as is shown in FIGURE 3) such that each coil side produces a magnetomotive force equal to 1/3 H*c*, where H*c* is the magnetomotive force required to drive a core to saturation, a selected core will have an applied force of 4/3 H*c* and other cores of 2/3 H*c*. If all the cores are saturated at either point "*a*" or point "*b*" on the saturation curve shown in FIGURE 5, a magnetomotive force, which is less than H*c*, applied to a core at either point "*a*" or point "*b*" will have relatively little effect on the core. It will remain at point "*a*" or point "*b*". However, if a magnetomotive force H, greater than H*c*, is applied to a core, after passage of that magnetomotive force, the core will be left at point *b* if H was negative and at point *a* if H was positive. It should therefore be obvious that by the proper selection of a current amplitude, in the matrix of saturable cores shown, only a core 20 within the intersection of the propertly excited coils has its condition affected. All the other cores remain unaffected. The direction of magnetization may be chosen by proper choice of the direction of current. Thus a core may be saturated to a condition representative of a "one" or a "zero" or a "yes" or "no" by being saturated to point *a* or saturated to point *b*.

Since the coercive force H*c* of the various cores may not be exactly the same, it is advantageous to have as high a discrimination ratio of magnetomotive force applied to a wanted core to that applied to an unwanted core as possible. As has been shown in FIGURE 4 and described herein, and as will appear from an inspection of the graph shown in FIGURE 6*a*, a higher discrimination ratio than 2:1 is obtainable if compensating currents in the opposite direction are used in the unselected loops. The amplitude of these compensating currents should be less than the selected current and the direction should be opposite. Considering FIGURE 6*a* it may be seen that with an excitation "X" of 3/8 H*c* applied to the selected core by each coil side of each coil and with a compensating excitation of 3/24 H*c* applied by each coil side of each coil having compensating current, the selected core 20 will have an excitation of 3/2 H*c*, and the non selected cores will have an excitation either of +1/2 H*c* or −1/4 H*c*. Thus the discrimination is 3 to 1.

FIGURE 7 is a typical circuit of a system for writing into and reading from the magnetic matrix. This circuit also represents an electric matrix for converting the four inputs from a binary code into the proper magnetic matrix address. Only a sufficient electrical matrix is shown to write into four rows. Only the ends of the transformer windings 23 which surround the cores are shown. However, it will be readily apparent from the following description how the electric matrix can be expanded to serve for all the rows and columns of cores of a magnetic matrix having a desired size.

The transformers 22 used are of the push-pull variety having a center tapped primary 24. The anode 28 of a tube 26 with several control grids is connected to each of the outer ends of the primary winding 24. The center of the primary winding 24 is connected to a source of B+. In the example the tubes have two control grids 30, 32 such as a pentagrid converter tube. The first control grid 30 and the second control grid 32 of the two tubes connected to the same transformer primary winding are connected together. The second control grid 32 of the tubes connected to alternate transformers are connected together. Since only four transformers are involved, the two sets of second control grids 32 are connected to two leads which are brought out to a first trigger circuit 36 represented by a rectangle. The first control grids 30 of tubes conected to the first two and the last two transformers are connected together. Two leads are brought out from the two sets of first control grids 30 to a second trigger circuit 38 represented by a rectangle. A pair of writing tubes 40, 42 are provided and the cathodes 34 of all the tubes connected to similar ends of the primaries of the transformers are connected to one of the cathodes 44 of the writing tubes 40, 42. The remaining cathodes 34 are connected to the remaining cathode 46 of the writing tubes. For additional rows, the additional grids of the electron tubes would be interconnected in similar fashion and brought out to additional trigger circuits or control bias applying means. However, the alternate cathodes of any additions to the electrical matrix would still be connected, in the manner shown, to the cathodes of the two writing tubes.

The first and second trigger circuits 36, 38 determine, by a proper application of bias, which of the two tube combinations connected to each of the transformers are predisposed to become conductive. The two writing tubes 40, 42 by their conduction, determine which one of these two tubes 26 conducts. Since the primaries 24 of the transformers are push-pull connected, the tube 26 that conducts determines the polarity of the current that flows in the secondary coil 23 and thereby the polarity of magnetization. The writing tube circuit therefore provides means for writing plus or minus and the first and second trigger circuits provide an address determining means.

A plus or minus writing pulse source 41 supplies the required positive or negative pulses through "or" gate 45 or 47 to the grid of writing tube 40 or 42 to render either writing the tube 40 or 42 conductive. The "or" gates 45 and 47 each may consist of a pair of tubes having a common plate load circuit which is coupled to the writing tubes. These tubes therefore provide an output for either of their inputs. The "or" gates 45 and 47 are used to provide isolation between the plus or minus writing pulse source and either a reading pulse source 54 or a delay line 56, the outputs from either of which are also applied to the writing tubes 40, 42 through the "or" gates 45, 47 for reasons which are subsequently herein described.

The plus or minus writing pulse source 41 is also connected to the restore gate 58. This restore gate 58 is normally open but is closed by the application of the positive writing pulse so that any resultant output pulse which may occur in the reading circuit 48 because of the writing is blocked and is not applied to the delay line 56. The restore gate 58 may simply be a normally conductive amplifier tube which is blocked by the application of a positive pulse to its cathode.

A reading circuit is schematically represented by the coil 48 which is representative of the coil 18 wound around the magnetic return path 12 as shown in FIGURE 2. This coil 48 is connected to apply any voltage induced therein to the grid of an amplifier tube 50. The amplifier tube output is connected to an indicator 52 or utilization circuit. To read from the magnetic matrix a pulse of current is sent through the loops identifying the core desired to be read. This pulse is always in the same direction and may be provided by the electric matrix. Assuming the polarity of the querying pulse as positive, if the selected element is saturated as at "*a*" (FIG. 5) the querying pulse will leave it there and practically no inducing flux will have passed through the core since the permeability is essentially that of air. If, on the other hand, the core were at "*b*" (FIG. 5), the querying pulse would bring it to "*a*" and thereby change the direction of magnetization. This will produce a large change of flux in the core and in the magnetic return path, thus inducing a fairly large voltage in the winding 48 around the magnetic return path. This voltage is amplified by the amplifier tube 50 and applied to the utilization circuit 52.

Since the act of reading destroys the stored information in the core being read, except when its magnetization is such as to be unaffected, a circuit arrangement must be provided to restore any cores whose information is destroyed. This may be readily accomplished by applying a pulse of current of opposite polarity to the coils enclosing the core which was read immediately after the querying pulse. In FIGURE 7 there may be seen a rectangle representative of a source of reading pulses 54 which is connected to apply its output through the "or" gate 47 to writing tube 42. The reading pulse causes the positive writing tube 42 to become conductive which in turn causes a positive current pulse to be applied to the coils enclosing the desired core. If the desired core, when read, changes its condition of magnetization, the voltage induced in the reading coil 48 is amplified by an amplifier tube 50 and then applied to a utilization circuit 52 and to the restore gate 58. The restore gate 58 is open and applies the amplified induced voltage to the delay line 56. The delay line 56 delays the application of the induced voltage to the negative writing tube 40 through the "or" gate 45 for a period long enough to permit the querying or reading pulse to be terminated. Then the delay line output, which may be called a restoring pulse, is applied to the negative writing tube 40. This causes a negative current to be applied to the coils defining the selected core to restore it to the condition of magnetization it had before the reading pulse was applied. It should be noted that no restoring pulse is applied and none is required if the desired core magnetization is unaffected by the reading pulse.

FIGURE 8 shows another embodiment of the magnetic matrix. This is provided by using a desired number of saturable, thin, magnetic, hollow, substantially cylindrical sheets or laminations having a somewhat rectangular shape. These are of a size and shape to be insertable one within the other and further, when so inserted, three of the walls 62, 64, 66 are substantially contiguous and the fourth walls 68 are spaced from each other to permit the insertion of coil wires. Each fourth wall has an aligned row of perforations 70, with easily saturable regions 72 between the perforations. The perforations 70 in all the fourth walls 68 are also aligned so that the saturable regions 72 in all the fourth walls are aligned also. A coil is used to enclose all the saturable regions in each of the fourth walls. Another coil 76 is used to enclose each of the aligned saturable regions in all of the fourth walls. These coils 74, 76 may, of course, be the single turn, secondary windings of the step-down transformers previously shown. Each of the saturable regions 72 is similar to the saturable cores 10 shown in FIGURES 1 and 2. The three contiguous walls 62, 64, 66 form a non-saturable magnetic return path. A detector coil 78 is wound around one of these three walls as was done in the embodiment of the magnetic matrix shown in FIGURES 1 and 2.

The close resemblance of the two structures is also borne out by the cross-sectional schematic view of FIGURE 8. This is a view of the saturable regions taken in a plane through the regions shown in FIGURE 9. It may there be seen that the saturable regions 72 fall into columns and rows and selection of any one region may be made by the proper excitation of the two coils 74, 76 enclosing a region in their intersection.

The magnetic matrix shown in FIGURE 8 may also be made from a single lamination which is bent to assume the form shown in FIGURE 8 of a plurality of substantially rectangular cylinders. Furthermore, each of the cylindrical sheets may be made up of a stack of cylindrical laminations in order to reduce eddy currents. The magnetic matrix may also be made more cylindrical in shape with the walls touching on one side and the aligned perforations in the opposite side. However, the rectangular shape shown is preferred since this obviously provides more contiguous wall area and thus the reluctance and chances of saturation of the common magnetic return path is reduced.

The magnitude of the currents involved in a magnetic matrix for saturation of magnetic materials like "Deltamax" or "Permeron," where $Hc = .12$ oersted, may be shown to be on the order of 1 ampere. For use with vacuum tubes therefore, stepdown transformers are required. However, low voltage, high current gas tubes with continuous grid control are available and may be directly connected to the matrix coils without using a transformer.

The access time to any core in the matrix is limited fundamentally by the eddy currents of the magnetic circuits. Using thin laminations, this may be pushed into the microsecond range.

Referring to FIGURE 10 and the cross-sectional plan view thereof shown in FIGURE 11, another preferred embodiment of my invention may be seen having a stacked laminated construction. For simplicity, only a matrix having 16 cores 90 is shown. Extension of the matrix to a greater number of cores should be obvious from the previously described embodiments of the invention together with the description of this embodiment of the invention. A number of sheets or laminations 92 of low reluctance magnetic material have several aligned openings 94 separated by small, easily saturable regions 96 of the magnetic material positioned along an axis of the material. Since only 16 cores are desired, only five openings are required separated by four saturable regions 96. The laminations 92 are gathered into four stacks 98. The number of laminations in each stack 98 determines the thicknes of the cores 90. This thickness may be varied in order to obtain the best response at a predetermined frequency of operation of the matrix. Also, the amplitude of the reading signal may, to a certain extent, be determined by the core thickness. The spacing between the stacks need only be sufficient to permit the insertion of the coils which enclose all the cores in each stack of laminations. The cores in each stack may be considered as a row of cores. It will be appreciated that for each stack of laminations the combined saturable regions 96 serve as the easily saturable cores 90 and the remainder of the material in the stack of laminations serves as a common low reluctance magnetic return path 100 for the cores in the stack. The amount of material in each of the saturable regions is made sufficiently small so that the cores including these regions are easily saturable. The amount of remaining material in each lamination is made sufficiently large so that in the stacked form it serves as a low reluctance return path for the cores in the stack. The four stacks 98 are positioned so that four selecting coils 102 enclose four columns of cores. Also each of four selecting coils 104 are used to enclose a row of cores in each of the four stacks. The reading coil 106 may consist of a coil wound around each of the end sections of the four stacks and then all the coils are connected in series-aiding fashion to provide a single output. Alternatively, a single coil may be threaded around the stack end sections to provide the same result. Openings between the saturable regions should be large enough to accommodate the wires of the selecting coils. The end openings should be large enough to accommodate the wires of the reading coil. Selection of a desired core and the reading of a condition of a core is the same as previously described. The cross-sectional view in FIGURE 11 is provided to show the similarity in structure and array of the cross-sectional views of the cores and selecting wires with those of the other embodiments of the matrix memory shown in FIGURES 1 and 9. Any desired number of stacks from a single stack and upwards may be used as a matrix memory. The number of cores in each stack may also be increased providing a sufficient amount of material to provide a low reluctance return path for the cores in the stack is retained.

Referring to FIGURE 12, there is shown a combinatorial interlaced loop system for use with the magnetic matrix. For the purposes of simplifying the drawing and required explanation, actually only half the number of networks required for selecting a desired core is shown. The loop network shown only selects a single row or column. The complete loop network required for selection of a single core is shown in FIGURE 13. The use of the combinatorial interlaced loops permit a reduction in the number of input leads to the matrix while at the same time permitting random access to the same number of cores in the magnetic matrix as with the greater number of input leads.

In FIGURE 12 there are shown only 6 coil leads 110, 112, 116 yet selection of any one of the eight columns may be made by excitation of the proper two coil leads 116. If one of the four top coil leads 110 and one of the two bottom coil leads 112 are excited, then only one of the eight rows has a double excitation. In the drawing, the number one opposite the coil leads indicates that those leads have excitation applied. The number zero indicates no excitation. The direction of current flow of the applied excitation is indicated by the arrow heads. For the first case shown, which is without compensatory excitation of any of the other loops, the cores in the third loop 114 from the left receives the maximum excitation, since the current flowing in the coil sides defining this loop flow in a direction to create an aiding electromagnetic field and apply two units of excitation. The remaining loops have the excitation as indicated by the numbers at the tops of the coils. The discrimination without compensatory excitation is therefore 2 to 1. By applying compensating currents of opposite polarity to the remaining loops and which have an amplitude of one-third of the current in the selected loops, the selectivity is increased to three to one. As indicated by the numbers below the numerals indicating the units of excitation without compensating currents, the third loop 114 from the left still receives two units of excitation, the remaining loops receive $$\frac{+2}{-3}$$

units of excitation. The discrimination in that case is 3 to 1. In determining the units of excitation within a loop only the loop or coil sides immediately defining that loop are to be considered, since, in practice, these are as close as possible to the cores and the spacing of the other adjacent coil sides is not as proximal as shown in the drawing. The coil ends are also spaced so as not to have any substantial effect on the cores within the coils.

Above the interlaced loops in FIGURE 12 is a symbolic system or shorthand method for representing the combinatorial interlaced loop system. This system is used henceforth since it renders what otherwise would be a complex drawing, extremely simple. The upper staggered horizontal lines represent the loops having their input leads 110 at the top part of the loop diagram. The lower staggered horizontal lines are representative of the loops having their input leads 112 at the lower part of the diagram. The numerals 0, 1, 2, 3 at each horizontal line are for identification. The lines are staggered to obtain separation. The vertical lines separate the columns. The same numeral, applied to more than one horizontal line on the same horizontal level, indicates that these coils are interconnected.

The horizontal extent of each line is indicative of the extent or number of columns spanned by the loop. For the upper horizontal lines it may readily be seen that each loop includes two columns. For the lower horizontal lines the zero loop at the left spans one column, then connects at the loop ends with a loop spanning the two columns which are the fourth and fifth columns to the right. This loop then connects with the last coil which encloses the last column. The very outermost return paths to left-hand terminals 112 do not contribute materially to the excitation, as may be verified by reference to the symbolic system at the top of FIG. 12. The lower horizontal lines which are identified by reference numeral one (1) span the second and third and sixth and seventh columns. One further point to be understood is that for the interconnected loops, such as those represented by the lower horizontal lines, the loop always begins at the extreme left and ends at the extreme right. Otherwise stated, the input to each of the loops is always applied to their outermost conductors. Since, as previously stated, the coils which surround the rows are identically positioned with respect to the rows as the coils which enclose the columns are to the columns, for a row coil representation the same line array would be shown vertically. Obviously, in view of the symmetry there is no need for this. By comparing the horizontal line drawing with the coil drawing beneath it, which it represents, comprehension of the symbolic horizontal line drawing will be facilitated and its simplicity will be appreciated.

By inspection, the horizontal line drawing also provides information as to which column enclosed in a loop receives the maximum number of units of excitation. In the coil diagram the coils corresponding to the lower horizontal line designated as one and the upper horizontal line designated as one were excited. The third column therefore received the maximum excitation. The upper and lower horizontal lines designated as one also overlap at the third column and this therefore affords a simple system for finding the coil which has the maximum excitation.

FIGURE 13 shows the combinatorial loop system shown in FIGURE 10 utilized for column and row excitation so that a single core may be selected. The selected core 20 has an excitation which is the sum of the excitations of four units. Selection is made by impressing a voltage upon one input 116 at each side of the matrix. The greatest unselected core (that is, the unselected core of greatest excitation) has an excitation which is the sum of the selected row in one dimension and the greatest unselected in the other. In other words A selected core has 2+2=4 units of excitation.

The greatest unselected core has $$\frac{n-1}{n+1}\times 2$$

units of excitation. Therefore the discrimination ratio $$D=\frac{4}{2+(2)\left(\frac{n-1}{n+1}\right)}=\frac{n+1}{n}$$

where $n$=the number of loops around each row in each dimension. In the system shown in FIGURE 11, $n=2$ therefore $D=3/2$.

Without compensation, the discrimination ratio would be only $$D=\frac{2n}{2n-1}$$

so that for the system shown in FIGURE 11, $D=4/3$, without compensation.

FIGURES 14, 15 and 16 show the horizontal line drawings for other, more complex, combinatorial interlaced loop systems. The columns are, as before, separated by vertical lines. The horizontal lines as before are staggered slightly to make the loop separations clear. In either FIGURE 14 or 15, by exciting one of the coils represented by the upper horizontal lines and one of the coils represented by the lower horizontal lines only one column (where the upper and lower horizontal lines overlap) receives the maximum units of excitation.

The representation in FIGURE 16 is one where there is a purely binary access to the memory, each column being surrounded by as many loops as there are binary positions to the number of columns. Since 16 columns are shown each column is therefore enclosed within four loops. Of course the same scheme of excitation is used for the rows. The system of combinatorial interconnection is simple. First, each half of the total numbered columns is enclosed by a loop, then each of the quarters is enclosed by a loop, then each eighth of the total number of columns and so on, each loop of lesser degree decreasing the number of columns enclosed by one-half. If another radix than 2 is used then the number of columns enclosed by each loop is made less each time by one divided by the radix.

The chosen column will have $n$ units of excitation, there being $2^n=16$ rows. The row having the next largest excitation will have $(n-1)=3$ units. This occurs when only the desired loops are excited. Therefore the discrimination is $n/n-1=4/3$. Therefore for $$\left.\begin{array}{l}2^n \text{ columns}\\ n \text{ loops per column}\\ D=n/n-1 \text{ discrimination}\end{array}\right\}\text{Uncompensated}$$

This same system works for any radix. Quite generally, if $$\left.\begin{array}{l}A=\text{radix, then}\\ A^n=\text{columns}\\ n=\text{loops per column}\\ D=n/n-1 \text{ discrimination}\end{array}\right\}\text{Uncompensated}$$

Now if a current of opposite polarity is applied to the unselected loops having an amplitude $$\lambda=\frac{n-1}{n+1}$$

for $A^n$ columns $n$ loops per column the discrimination $$D=\frac{n+1}{n-1}$$

This is readily seen to be greater than the discrimination obtainable without these opposing or compensating currents.

Considering the possible obtainable discrimination for cores instead of columns, if in the unselected loops a current in the opposite direction of $$\lambda=\frac{n-1}{n+1}$$

is used and if there are $A^n$ cores with $n$ loops, the discrimination $$D=\frac{n+1}{n-1}$$

and the ratio of unselected to selected loop currents will be $$\frac{n-1}{n+1}$$

(e.g. $n=2$, $D=3$ the ratio is 1/3 as before).

The magnetic matrix thus far described is a one-channel device in the sense that access to it for reading or writing, at any instant, is only possible to one element. To obtain a multi-channel device in which access is possible to many channels simultaneously, several such matrices may be used. The address loops of all the electric matrix systems are connected together, each similar loop in the different matrices being associated. The connections of the associated loops may be series or parallel. Circuit provisions must be made to allow change of direction of current flow in each matrix separately in order to be able to register a different digit in each matrix. The reading coils of each matrix are connected separately to the output reading amplifiers.

From the foregoing description, it will be readily apparent that an improved memory system consisting of a magnetic matrix permitting rapid random access including serial access thereto has been provided. The matrix is simple in construction and operation. It may be made very small and compact. Although several embodiments of the present invention have been shown and described, it should be apparent that many other embodiments are possible, all within the spirit and scope of the invention. It is therefore desired that the foregoing description shall be taken as illustrative and not as limiting.

What is claimed is:

1. A random access magnetic device comprising a plurality of cores made of magnetic material, a common low reluctance magnetic return path for said cores, and means to selectively apply a magnetomotive force to a desired one of said cores sufficient to drive it to a desired condition of saturation, and output means including a coupling winding linked to said return path.

2. A random access magnetic memory comprising a plurality of cores made of magnetic material, a common low reluctance magnetic return path for said cores, means to selectively apply a magnetomotive force to a desired one of said cores sufficient to drive it to a saturated condition, and means to detect the condition of saturation of a desired one of said cores including means coupling to said common return path to a different degree from the coupling of said return path to said cores.

3. A random access magnetic device comprising a plurality of cores made of magnetic material, a common low reluctance magnetic return path for said cores, means to selectively apply a magnetomotive force to a desired one of said cores sufficient to drive it to saturation, and means to detect the polarity of magnetization of one of said cores which is being driven from a predetermined condition of saturation including a winding linking said common return path.

4. A random access magnetic memory comprising a plurality of cores made of magnetic material, a common low reluctance magnetic return path for said cores, means to selectively apply a magnetomotive force to a desired one of said cores sufficient to drive it to a desired condition of saturation, and coil means coupled to said magnetic return path to detect a change in the polarity of magnetization of one of said cores which is being driven from a predetermined condition of saturation.

5. A random access magnetic matrix memory comprising a plurality of cores made of magnetic material, said cores being arranged in columns and rows, a common low-reluctance magnetic return path for said cores, a plurality of coils, each of said rows and each of said columns being enclosed by one of said coils, means to selectively impress a voltage upon a desired one of said coils enclosing one of said rows and upon a desired one of said coils enclosing one of said columns to cause the magnetomotive force generated by both said selected coils responsive thereto to be applied to a core enclosed within the intersection of said coils to drive said core to a condition of saturation, and coil means coupled through said magnetic return path to more than one core by the same coupling to detect a change in the polarity of magnetization of one of said cores which is being driven from a predetermined condition of saturation.

6. A random access memory as recited in claim 5 wherein said cores are made of a magnetic material having properties such that its hysteresis curve is substantially rectangular.

7. A random access matrix magnetic memory comprising a plurality of cores made of laminated magnetic material, said cores being arranged in columns and rows, a common low reluctance magnetic return path for each of said rows of cores, a plurality of coils, each of said rows and each of said columns being enclosed by one of said coils, means to selectively impress a voltage upon a desired one of said coils enclosing one of said rows and upon a desired one of said coils enclosing one of said columns to cause the magnetomotive generated by both said selected coils responsive thereto to be applied to a core enclosed within the intersection of said coils to drive said core to a condition of saturation, and coil means coupled to all said magnetic return paths to detect a change in the polarity of magnetization of one of said cores which is being driven from a predetermined condition of saturation.

8. A random access magnetic matrix memory comprising a plurality of cores made of magnetic material, said cores being arranged in columns and rows, a common low reluctance magnetic return path for said cores, a plurality of coils, each of said rows and each of said columns being enclosed by one of said coils, means to selectively impress a voltage on a desired one of said coils enclosing one of said rows and on a desired one of said coils enclosing one of said columns to cause the magnetomotive forces generated by both said selected coils to be applied to a core enclosed within the intersection of said coils, the polarity of said impressed voltages being such that the magnetomotive forces are aidingly applied by both said selected coils to said core at said intersection, each of said impressed voltages having a value sufficiently low to prevent the magnetomotive force generated by said coils upon which it is impressed from driving any of the cores enclosed by said coil to saturation and sufficiently high to permit said aiding magnetomotive forces to drive said core enclosed within said intersection of said coils to saturation, means to inpress a voltage upon each of the remaining coils, said voltage having an opposite polarity and a lower value than the respective voltages impressed upon each of said selected coils, and coil means coupled to said magnetic return path to detect a change in the polarity of one of said cores which is being driven from a predetermined condition of saturation.

9. A random access magnetic memory comprising a plurality of cores made of magnetic material, said cores being arranged in columns and rows, a common low reluctance magnetic return path for said cores, a plurality of coils, each of said rows and each of said columns being enclosed by one of said coils, means to selectively impress voltages upon a desired one of said coils enclosing one of said rows and upon a desired one of said coils enclosing one of said columns to cause the magnetomotive force generated by both said selected coils responsive thereto to be applied to a core enclosed within the intersection of said coils, said impressed voltage being of a sufficient amplitude to drive said enclosed core to saturation, and coil means coupled to said magnetic return path to detect a change in the polarity of magnetization of one of said cores which is being driven from a predetermined condition of saturation, and means responsive to a detection by said coil means of a change in the polarity of magnetization of one of said cores to restore said core to its predetermined condition of saturation.

10. A random access memory as recited in claim 9 wherein each of said cores is made of a magnetic material having properties such that its hysteresis curve is substantially rectangular.

11. A random access magnetic memory as recited in claim 9 wherein said means to restore said core to its predetermined condition of saturation comprises a delay line having a time delay longer than the duration of the voltage which is applied to cause a one of said cores to be driven from a predetermined condition of saturation, means coupling the output of said coil means to said delay line input, means coupling the output of said delay line to said means to selectively impress voltages upon said ones of said coils enclosing in their intersection said last-named core to restore said core to its predetermined condition of saturation.

12. A random access magnetic matrix memory comprising a plurality of cores made of easily saturable magnetic material, said cores being arranged in columns and rows, a common low-reluctance, magnetic return path for said cores, a plurality of coils, each of said rows and each of said columns being enclosed by one of said coils, means to selectively impress voltages on a desired one of said coils enclosing one of said rows and on a desired one of said coils enclosing one of said columns to cause the magnetomotive forces generated by both said selected coils to be applied to a core enclosed within the intersection of said coils, the polarity of said impressed voltages being such that the magnetomotive forces are aidingly applied by both said selected coils to said core at said intersection, each of said impressed voltages having a value sufficiently low to prevent the magnetomotive force generated by said coils upon which it is impressed from driving any of the cores enclosed by said coil to saturation and sufficiently high to permit said aiding magnetomotive forces to drive said core enclosed within said intersection of said coils to saturation, means to impress voltages upon each of the remaining coils, said voltage having an opposite polarity and a lower value than the respective voltages impressed upon each of said selected coils, coil means coupled to said magnetic return path to detect a change in the polarity of one of said cores which is being driven from a predetermined condition of saturation, a delay line having a time delay longer than the duration of the voltage which is applied to cause a one of said cores to be driven from a predetermined condition of saturation, means coupling the output of said coil means to said delay line input, and means coupling the output of said delay line to said means to selectively impress voltages upon the desired ones of said coils respectively enclosing in their intersection said last-named core to restore said core to its predetermined condition of saturation.

13. A random access magnetic memory comprising a plurality of fitted together magnetic members each being a hollow, thin walled, substantially rectangular cylinder, said members being dimensioned to fit inside one another with three rectangular walls in close contact with one another and the fourth rectangular walls spaced from each other, said fourth walls having a plurality of aligned apertures with easily saturable regions between said apertures, means to selectively apply a magnetomotive force to a desired one of said regions sufficient to drive it to a condition of saturation, and means coupled to one of said three walls to detect a change in the polarity of magnetization of one of said regions which is being driven from a predetermined condition of saturation.

14. A random access magnetic memory as recited in claim 13 wherein said plurality of fitted together magnetic members are made from a single sheet of lamination shaped to provide said plurality of fitted together substantially rectangular cylinders.

15. A random access magnetic memory comprising a plurality of fitted together magnetic members, each being a hollow thin walled substantially rectangular cylinder, said members being dimensioned to fit inside one another with three rectangular walls in close contact with one another, the fourth rectangular walls spaced from each other, said fourth walls having a plurality of aligned apertures forming a plurality of easily saturable aligned regions between adjacent ones of said apertures, a plurality of coils, all of said regions in each of said fourth walls being enclosed by one of said coils, each of said aligned regions in all of said fourth walls being enclosed by one of said coils, means to selectively impress voltages upon a desired one of said coils enclosing all of said regions in a fourth wall and upon a desired one of said coils enclosing one of said aligned regions in all of said fourth walls to cause the magnetomotive forces generated in said coils to be applied to a region enclosed within the intersection of said coils to drive said region to saturation, and coil means coupled to one of said three walls to detect a change in the polarity of magnetization of one of said regions which is being driven from a predetermined condition of saturation.

16. A random access magnetic matrix memory comprising a plurality of fitted together magnetic members, each being a hollow, thin walled substantially rectangular cylinder, said members being dimensioned to fit inside one another with three rectangular walls in close contact with one another, the fourth rectangular walls being spaced from each other, said fourth walls having a plurality of aligned apertures forming a plurality of aligned easily saturable regions between adjacent ones of said apertures, a plurality of coils, all of said regions in each of said fourth walls being enclosed by one of said coils, each of said aligned regions in all of said fourth walls being enclosed by one of said coils, means to selectively impress voltage upon a desired one of said coils enclosing all of said regions in a fourth wall upon a desired one of said coils enclosing one of said aligned regions in all of said fourth walls, the polarity of said impressed voltages being such as to cause the magnetomotive forces generated responsive thereto in said coils to be aidingly applied to a region enclosed within the intersection of said coil to drive it to a desired condition of saturation, means to impress voltages upon the remaining ones of said coils having a lower amplitude and opposite polarity to the voltages selectively impressed on the desired ones of said coils to reduce the effects of the magnetomotive forces generated by said desired coils on regions other than the one in said intersection, coil means coupled to one of said three walls to detect a change in the polarity of magnetization of one of said regions which is being driven from a predetermined condition of saturation, and means responsive to a detection by said coil means to restore said last-named region to its predetermined condition of saturation.

17. A random access magnetic matrix memory comprising a plurality of stacks of laminations of a low reluctance magnetic material, each of said stacks including a plurality of aligned perforations, said perforations being made sufficiently close to each other to provide saturable magnetic material regions therebetween hereafter called cores, the material of each of said stacks of limitations other than said cores having a size to provide a low reluctance non-saturable magnetic return path for all said cores in each of said stacks, means to selectively apply a magnetomotive force to a desired one of said cores to drive it to a desired condition of saturation and means to detect the saturated condition of a desired one of said cores including a coupling to said return path.

18. A random access magnetic matrix memory as recited in claim 17 wherein said means to selectively apply a magnetomotive force to a desired one of said cores includes a plurality of first coils, each of said first coils enclosing all of the cores of each stack of laminations, a plurality of second coils, each of said second coils enclosing one of said cores in every one of said stacks and said means to detect the saturated condition of a desired one of said cores includes a coil wound around all the low reluctance magnetic return paths of said plurality of stacks.

19. A random access magnetic matrix memory comprising a plurality of cores made of magnetic material, said cores being arranged in a regular matrix pattern, a common low reluctance, magnetic return path for said cores, a plurality of coils interlaced among said cores in combinatorial fashion, means to selectively excite at least two of said coils to apply additively the electromagnetic forces generated by said excited coils to a desired one of said cores to drive it to saturation and coil means coupled to said magnetic return path to detect a change in the polarity of magnetization of one of said cores which is being driven from a predetermined condition of saturation.

20. A random access memory as recited in claim 19 wherein there is additionally provided means to excite the nonselected loops with an excitation having a lesser amplitude and opposite polarity to the excitation applied to said selected loops to increase the discrimination of the system.

21. A magnetic memory having an access in accordance with a predetermined radix comprising a plurality of cores of an easily saturable magnetic material, said cores being arranged in a regular matrix of columns and rows, a common low reluctance magnetic return path for said cores, a plurality of combinatorially connected interlaced loops surrounding each of said rows and each of said columns, the number of loops surrounding each row and each column being equal to the exponent to which the radix is required to be raised to equal the number of rows or columns, means to selectively excite a number of said loops surrounding said columns and a number of said loops surrounding said rows to apply additively the electromagnetic forces generated by said excited coils to a desired one of said cores to drive it to saturation, said number of excited loops for said rows and for said columns being equal to said exponent, and coil means coupled to said magnetic return path to detect a change in the polarity of magnetization of one of said cores which is being driven from a predetermined condition of saturation.

22. A magnetic memory as recited in claim 21 wherein there is additionally provided means to excite the non-selected loops with an excitation having an opposite polarity to the excitation applied to said selected loops, and having an amplitude equal to said exponent minus one divided by said exponent plus one, whereby the discrimination of selected to unselected cores is increased.

23. A binary access magnetic memory comprising a plurality of cores made of easily saturable magnetic material, said cores being arranged in a regular matrix pattern of columns and rows, a common low reluctance magnetic return path for said cores, a plurality of combinatorilly connected interlaced loops surrounding each of said rows and each of said columns, the number of loops surrounding each row and each column being equal to the exponent to which the binary number two is raised to equal the number of rows or columns, means to selectively excite a number of said loops surrounding said columns and a number of said loops surrounding said rows to apply additively the electromagnetic forces generated by said excited coils to a desired one of said cores to drive it to saturation, said number of excited loops for said rows and for said columns being equal to said exponent, and coil means coupled to said magnetic return path to detect a change in the polarity of magnetization of one of said cores which is being driven from a predetermined condition of saturation.

24. A random access magnetic memory comprising a plurality of cores made of magnetic material, means to selectively apply a magnetomotive force to a desired one of said cores sufficient to drive it to a desired condition of saturation, and means coupled to each of said cores to detect a change in the polarity of magnetization of one of said cores which is being driven from a predetermined condition of saturation including a common magnetic return path for said cores and a coupling to said return path.

25. A random access magnetic matrix comprising a plurality of cores of magnetic material arranged along a plurality of paths each of which intersects another at a separate one of said cores, a plurality of coils each coupled to the cores of a separate one of said paths, means for selectively impressing a voltage upon a desired pair of said coils along two of said intersecting paths to cause the magnetomotive forces generated by said pair of coils at the core at which said two paths intersect to be applied to said last mentioned core to drive it to a condition of magnetic saturation in a predetermined direction, means providing a common, low reluctance return path for said cores, and coil means coupled to said magnetic return path means for detecting a change in polarity of magnetization of any one of said cores.

26. An information storage device comprising at least one sheet of magnetic material, a plurality of elements, each element having two stable states and having a response-excitation characteristic of a substantially rectangular hysteresis-loop type and each element including at least a portion of said sheet, a plurality of energizing means for each element, said energizing means being designated by coordinates for each element, connections for effecting simultaneous energization of all corresponding energizing means of a group of elements having the same coordinate designation, whereby each of said elements receives an excitation sufficient to effect a partial change of state, and switching means for effecting coincidental energization of more than one energizing means for selected elements.

27. An information storage device comprising: a plurality of individual elements, each element having two stable states and having a response-excitation characteristic of a substantially rectangular hysteresis-loop type; a plurality of energizing means for each element, said energizing means being designated by coordinates for each element; means for applying to the energizing means in some of the coordinates sufficient excitation to effect a change of state of a selected element and excitation to other elements less than that required to effect a change of state; and means for applying to the energizing means of other coordinates a counteracting excitation to only said other elements to improve the discrimination ratio.

28. Apparatus for the storage of units of information comprising at least one sheet of magnetic material, a plurality of similar elements responsive to electrical excitation, each element comprising a portion of said one sheet and having two stable states and having a response-excitation characteristic of a substantially rectangular hysteresis loop type whereby at least a threshold excitation is required to change from one state to the other, means for generating a plurality of excitations, and means for applying to each of the elements separate and coincident excitations each of which is alone capable of effecting a partial change of state which are additively effective to apply a net total excitation greater than the threshold to any chosen element.

29. Information storage apparatus comprising: a plurality of storage elements, each element having two stable states and having a responsive-excitation characteristic with substantial hysteresis properties; a plurality of energizing devices for each element, said energizing devices for the several elements being arranged in main groups, each element having an energizing device of each of the several main groups, said main groups being divided into sub-groups; connections to connect all of the energizing devices of each sub-group to provide equal and simultaneous excitation to all of the energizing devices of said sub-group, whereby each element corresponds to a unique combination of sub-groups; operating means for effecting simultaneous excitation of one or more selected sub-groups from each of certain of the main groups to cause the combined energizing effect thereof to be above the level necessary to change the stable state of a selected element and insufficient to effect a change of state of other elements; and operating means for effecting counteracting excitation of sub-groups from at least one other main group and said counteracting excitation having a magnitude less than that which would prevent the change of state of any selected element which would be selected in the absence of said counteracting excitation.

30. Information storage apparatus comprising: a plurality of magnetic storage elements, each element having two stable states and having a response-excitation characteristic with substantial hysteresis properties; a plurality of energizing windings for each element, said energizing windings for the several elements being arranged in main groups, each element having an energizing winding of each of the several main groups, said main groups being divided into sub-groups; connections to connect all of the energizing windings of each sub-group to provide equal and simultaneous excitation to all of the energizing windings of said sub-group, whereby each element corresponds to a unique combination of sub-groups; operating means for effecting simultaneous excitation of one or more selected sub-groups, from each of certain of the main groups to cause the combined energizing effect thereof to be above the level necessary to change the stable state of a selected element and insufficient to change the state of other elements; and operating means for effecting counteracting excitation of sub-groups from at least one other main group to apply counteracting excitation to only said other elements.

31. In a memory system of magnetic information storage elements, said elements having substantially square loop hysteresis properties, and of the type wherein coincident signals of one polarity are used to read from or record in selected elements, the combination with said elements of means for applying an opposite polarity signal to said elements to produce a greater ratio than would otherwise obtain between the net signal applied to selected elements and the greatest net signal applied to unselected elements, said opposite polarity signal being less in magnitude than required to prevent the selection of any element which would be selected in the absence of said opposite polarity signals.

32. A magnetic memory device comprising a pair of blocks of magnetic material, a plurality of storage elements, said elements including magnetic material between said blocks and having substantially rectangular hysteresis properties, a plurality of separate independent energizing conductors for each element, each conductor being common to a group of elements and energizing all the elements in that group to effect a partial change of state, the conductors being arranged in coordinate groups, and means for controlling the coincidental excitation of the unique coordinate combination of energizing conductors of a selected element to effect a change of magnetic state thereof without changing the state of the other energized elements in the energized groups.

References Cited by the Examiner

UNITED STATES PATENTS

| | | | |
|---|---|---|---|
| 2,440,984 | 5/48 | Summers | 175—183 |
| 2,540,654 | 2/51 | Cohen | 235—61 |
| 2,549,071 | 4/51 | Dusek | 235—61 |

OTHER REFERENCES

6/46-Progress Report (2) on the EDVAC, vol. II, Moore School of Electrical Engineering, U. of Pa., Phila., Pa.

Pages 49–54, 1/50-Static Magnetic Storage and Delay Line by An Wang and Way Dong Woo; Journal of Applied Physics.

Pages 44–48, 1/51-Journal of Applied Physics, vol. 22, No. 1.

IRVING L. SRAGOW, *Primary Examiner.*

L. MILLER ANDRUS, RALPH R. YOUNG, HILLEL MARANS, *Examiners.*